Oct. 18, 1955 — C. M. L. L. BOURCIER DE CARBON — 2,721,074
HYDRAULIC-PNEUMATIC SHOCK ABSORBER
Filed June 17, 1949
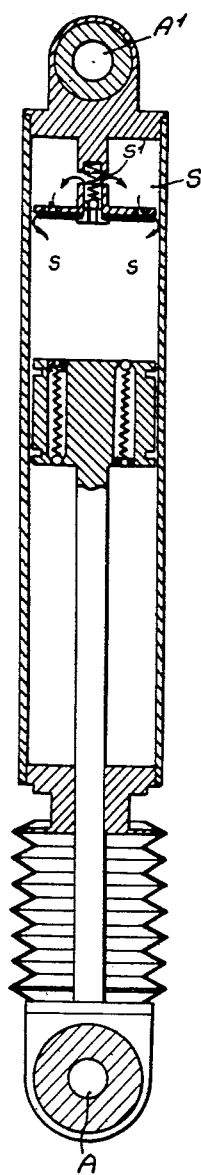
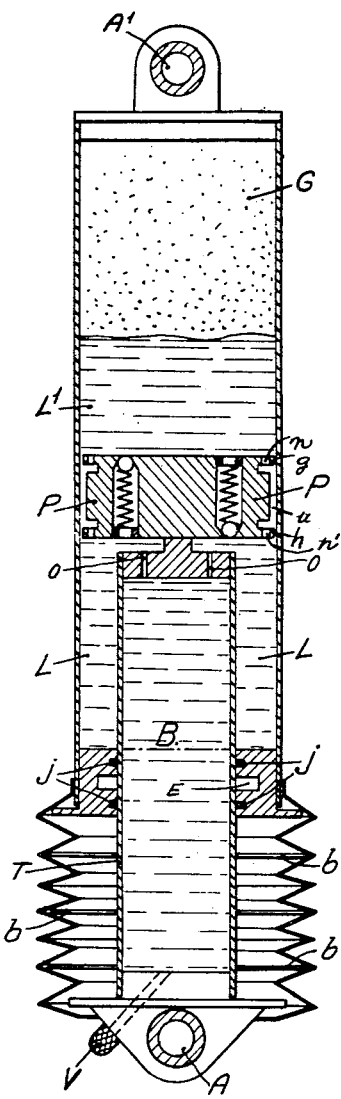

United States Patent Office 2,721,074
Patented Oct. 18, 1955

2,721,074

HYDRAULIC-PNEUMATIC SHOCK ABSORBER

Christian Marie Lucien Louis Bourcier de Carbon,
Paris, France

Application June 17, 1949, Serial No. 99,796

Claims priority, application France June 18, 1948

3 Claims. (Cl. 267—64)

My invention deals, in the first place, with making use of compressed air in hydraulic suspension shock-absorbers and the structural simplicity obtainable by this method; in the second place, some simple alterations enable this equipment to be converted into oil and air shock-absorbers that may be adapted to all land vehicles and to landing-gear for aircraft.

Other objects and features of novelty pertaining to the invention are set forth below and will become readily apparent from the detailed description of certain exemplary embodiments of the invention which are illustrated in the accompanying drawings, in which:

Figure 1 is a view in vertical cross-section of a shock absorber exemplifying the type of shock absorber to which the present invention relates; and Figure 2 is a similar view of a combined shock absorber and resilient suspension in which a hollow piston rod is employed.

In a previous French patent in the name of the same applicant, No. 948,067, under date of May 31, 1947 for "Improvements to Direct-Acting Hydraulic Suspension Shock-Absorbers," (corresponding to U. S. application Serial No. 22,836, filed April 23, 1948, and now abandoned), a description has been given of a direct-acting shock-absorber, of which the chief characteristic includes, in accordance with Figure 1 of the accompanying drawings, the reversing of the customary arrangement (that is to say the connection of the piston at A to the axle and that of the cylinder at A', to the undercarriage), this reversing being required for the avoidance of the cavitation phenomena in the case when the body of the shock-absorber is provided with only a single tube. The shock-absorber as disclosed was finished off, moreover, by an upper chamber S intended to be used at one and the same time as an oil-container and as a balancing capacity for the piston-rod; this chamber was furnished with a system of valves, $s$, $s_1$ intended for the avoidance of any cavitation phenomena.

My invention deals in the first place with a simplifying of this pattern of shock-absorber with the feasibility of doing away with the panel of the upper chamber and the valve system with which it is provided on the sole understanding that this chamber is filled with air or highly compressed gas G of which the expanding power will prevent any cavitation, that is to say the setting-up of vacuum pockets in the portion of the cylinder located under the piston.

In the second place, my invention refers to an alteration in the equipment, of which a description has been given, that enables such equipment to play the part not only of a suspension shock-absorber, but also and at the same time that of suspension, that is to say of a flexible support between the axle and the chassis, or under-carriage. It is obvious, as a matter of fact, that the pressure $p$ of the air compressed inside the shock-absorber conveyed by the oil on the section $s$ of the piston-rod will have a tendency to cause the latter to leave the cylinder with a power $P = p \times s$.

The result of this is that if the piston-rod is big enough (Figure 2) (for instance of a cross section $s$ of 10 to 15 square centimetres) and if the pressure of the compressed air is high enough (for instance of 20 to 30 atmospheres, say 294 to 440 pounds per sq. inch), the power $P = p \times s$ may reach a figure equal to the weight of the chassis sprung on one wheel, and the shock-absorber with large piston-rod will thus form a genuine damped suspension, enabling the elimination to be effected of metallic plate or volute springs, torsion bar suspension, etc. of which use is made as a rule as suspension parts for motor cars and in a more general way on all land vehicles.

The piston-rod T may be equally solid or tubular such as that given in figure 2. The tubular shape shows first of all the advantage of decreasing the weight of the equipment; it enables, moreover, the inflation valve for the equipment to be located at V. In this case, the inside B of the tubular rod should be filled with oil and placed in communication, for instance through openings $o$, while these openings $o$ emerge preferably in the portion L of the cylinder that is on the side of the rod T. This arrangement gives improved fluid tightness to the valve by placing it in contact with the oil instead of having direct contact with the air, as would be the case of the valve $V^1$ that might be used in the event of a solid rod.

Such an arrangement possesses the advantage of being extremely simple thus leading to a very low net cost; but nevertheless it does show a slight drawback, in that it restricts the available travel for a given minimum clearance of the fastening points A and $A^1$, since for the preservation of its efficiency in the shock-absorbing damper, the piston P must not be able to come into view outside the liquid and go into the gas G.

The preservation of the pressure inside similar types of equipment is a very hard problem to solve; it is only feasible through making use of a completely fluid tight joint such as that already disclosed in which the most advantageous form of execution seems to be as follows: several small cylindrical rubber rings $j$, for instance two in number housed with a slight amount of forcing in grooves of the same shape, in accordance with Figure 2 and kept apart by a cylindrical cavity E that will be filled with heavy oil with the dual object of being used for oiling the rod and increasing the fluid tightness of the joint through the effect of this thick oil plug, since actual experiments, in agreement with the theoretical view, show that leakages through a similar joint are in inverse proportion to the viscosity of the contacting fluid. An improvement in this type of joint will consist besides in replacing one of these rubber rings (and preferably in thus case the scraper ring located furthest to the outside, that is to say the lower ring in the arrangement of Figure 2) or even several of these rings by similar rings of polyvinyl chloride, since the inventor has found that a joint formed in this way is quite fluid tight and stands up to wear extremely well, in a way far above that of the various rubbers.

The joint that has been described has however the drawback of being rather easily broken, which forces the rod T to be guarded carefully from anything thrown up from the wheels or from the road. For the arrangement of Figure 2, in which the joint is in the lower portion, it is not practicable to solve the question simply and solely by means of a tubular catchment in which might be collected the rainwater and the mud. The best way of solving the problem that enables the rod T to be guarded in a perfect manner and that must be regarded as part of my invention, first of all as a simple protecting device for the rod of a suspension shock-absorber or of a damped suspension, above all when the rod T is located below as in Figure 2, then and more especially as protecting device linked to the joint that has been described, it is that of a rubber "concertina" (Figure 2) of which the lower end may be fixed rigidly with the lower fastening point (Figure 2). In the case of a "concertina" that is too long, an improvement in this method of protection consists in inserting inside the bellows one or more flat washers such as b (Figure 2) so as to give more steadiness and more lateral stiffness to the central portion of the "concertina," without interfering on that account with its longitudinal movement.

With reference to the fastening connections of the equipment on the one hand to the chassis, on the other hand to the axle, use may be made of connections through spindles and cylindrical sleeves that may be either of rubber (diabolos) or of metal.

The various characteristics mentioned above, for instance those dealing with the protective device for the rod, linked or otherwise to this type of joint, form as a matter of course part of the invention whether they are taken together or separately. In the same way, if the shock-absorber or the damped suspension is provided with the assembly arrangements described above, the shock-absorbing piston may be of any pattern. But there are already on the market numerous hydraulic shock-absorber devices or damped oil and air suspensions; now, in all such apparatus, what controls chiefly the reactions conveyed to the chassis is bound up with the damping law for the shock-absorbing piston; accordingly, the invention contemplates more especially making use of, under the same assembly conditions, the laminar piston (that is to say fixed up so as to leave existing for the fluid slit-shaped channels where the fluid goes through as thin jets) that has been described already in the previous patents mentioned above.

The chief characteristic of this laminar piston consists in a braking effect on the fluid of which use is made, not by compelling it to go through openings or valves drilled in the piston, but by compelling the fluid to be wiredrawn or throttled along an exceedingly thin annular layer $u$ between the piston and the cylinder, while the core of this piston furthermore may be rigid and improved through adding valves according, to Figure 2, or flexible and made by piling on each other a series of thin washers made of metal or of any plastic material that is strong enough such as disclosed already in previous patents. As an additional feature, the centering of the piston may be ensured by means of two small collars $g$ and $h$, that are themselves drilled with enough openings $n$ and $n_1$, so as to lower to a negligible quantity any braking effect on the fluid as it passes through these openings; but this centering, of course, might be carried out by any means without going outside the scope of my invention.

This arrangement possesses appreciable advantages in that, as has been proved by mathematical calculation and as confirmed by tests conducted by the inventor, the damping law is then double-acting and symmetrical along a straight line (that is to say that the resistance varies in proportion to the speed of the piston).

The wiredrawing or throttling of the fluid as it passes through may be effected in various ways; as described in the copending application Serial No. 22,836 (see French addition 44,277, filed May 2, 1947, on French Patent 936,178, and also French Patent 948,067, filed May 31, 1947), it may be obtained by leaving existent a certain amount of play between the piston and the cylinder-wall; it may be carried into effect also by arranging one or more slits in the piston body, as shown in the various modifications of my copending application Ser. No. 398,594, filed December 16, 1953.

It is known already that, in every suspension, the damping of the shock-absorber should increase with the load and the present inventor has been able to work out mathematically and confirm by means of experiments that in every suspension of which the shock-absorption damping follows the linear law $F=f.v$ the optimum coefficient $f$ is equal to $$\sqrt{\frac{mK}{2}}$$

while denoting by $m$ the suspended weight, by $K$ the stiffness of the suspension spring and by $v$ the vertical speed of the chassis. The consequence of this is that with constant flexibility suspensions, the coefficient $f$ of the damping should vary with the load $m$, that is to say with the position of the piston in the cylinder. With valve arrangements of which use is made as a rule, the perfection of a variation of the damping coefficient with the position of the piston in the cylinder would involve an intricate mechanism, while with a laminar piston, all that has to be done is to take a slightly tapering tube in order to perfect the suitable variation of the coefficient $f$. This arrangement forms likewise part of my invention.

In the case of an air suspension, this variation of the damping coefficient with the position of the piston is a far more urgent question and the variations required are more extensive since the flexibility $K$ is then itself in proportion to the load $m$. The previous answer to the problem then becomes highly desirable if it is noted that this problem up to now has required more intricate mechanisms as may be seen, for instance, in the French Patent No. 826,293 of December 10, 1936, in the name of the André Citroen Company and in the French Patent No. 929,415 of June 10, 1946, in the name of the company known as: Ribbesford Company Limited.

It is understood that all the mechanical arrangements disclosed in the present patent still form part of my invention if the liquid intended for the damping of the shock-absorber is cut out all the equipment being filled only with compressed gas. Such a solution shows, as a matter of fact, great advantages and it is easy to carry out owing to the laminated piston that enables the exact (as pointed out already above) carrying out to be effected of a suitable shock-absorption through direct damping on the gaseous fluid, when it is just the difficulties of direct damping on the gaseous fluid that have most often induced the inventors of air suspensions to partly fill with liquid so as to damp more easily on this liquid.

A primary advantage of this solely pneumatic answer to the problem is that it is automatically thermostatic, since the viscosity of the gases is in practice outside the control of the temperature, but the most appreciable advantage is still the following: when it is essential, in order to execute the suitable variation of the damping coefficient $f$ with the load, to make use of a tube having the right amount of tapering, it may be shown that a solely pneumatic suspension agreeing with the diagram of Figure 2 with a suitably calculated laminar piston in a perfectly cylindrical tube has a damping law corresponding strictly to the law $$f=\sqrt{\frac{mK}{2}}$$

and that is so whatever may be the load and the temperature.

Having now particularly described as ascertained the nature of my said invention and in what manner the same is to be performed, I declare that what I claim is:

1. A suspension and shock absorber device adapted for connection between two relatively movable upper and lower parts, said device comprising a cylindrical casing enclosing a working chamber and having a closed upper end, said casing adapted to be connected to the upper one of said parts; a piston disposed for reciprocation in said working chamber and having a piston rod rigid therewith extending from one face thereof and passing through a packed opening in the lower end of the casing, the end of the piston rod remote from the piston adapted to be connected with the lower one of said parts; a liquid damping medium in said working chamber within which the piston is adapted to move, the piston dividing said chamber into two portions of reciprocally variable capacity; by-passing means in conjunction with said piston for the passage of fluid from one of said chamber portions to the other as said piston reciprocates upon the occurrence of relative movement of said parts, a quantity of gaseous fluid under pressure in the upper portion of said chamber, said gaseous fluid being in direct contact with said liquid, and said upper portion of the chamber being clear of any means other than the walls of said cylinder and piston which would affect the movement of the liquid under the influence of the movements of said piston, said piston rod being hollow and the hollow interior thereof being filled with said working liquid, and openings in the upper end of said hollow piston rod adjacent the point where it joins the piston for placing the interior of said hollow piston rod in communication only with that portion of the working chamber which is on the under side of the piston.

2. A suspension and shock absorber device adapted for connection between two relatively movable superposed members to resiliently support the upper one of said members upon the other, said device comprising a cylindrical casing enclosing a cylindrical chamber and having a closed end, and means for securing said cylinder to the upper one of said members; a piston disposed for reciprocation in said cylinder, a piston rod extending from one side of said piston through a packed opening in the opposite end of said casing, means for securing the remote end of said piston rod to the lower one of said members; a liquid damping medium occupying the lower portion of said chamber within which the piston is adapted to reciprocate, the piston dividing said chamber into two portions of reciprocally variable capacity one upon either side of said piston; by-passing means in conjunction with said piston for the passage of fluid from one of said chambers to the other as the piston reciprocates upon the occurrence of relative movement of said member, a quantity of gaseous fluid in the upper end of the cylinder above the level of the working liquid damping medium, said gaseous fluid being under sufficient pressure to effectively support the upper member from the lower one, said piston rod being hollow and being filled with said liquid medium, and openings in said hollow piston rod adjacent the point where it joins the piston for placing the interior of said hollow piston rod in communication only with that portion of the working chamber which is on the same side of the piston as said rod.

3. The device as set forth in claim 2 in which a valved filling opening is provided in the lower end of the hollow piston rod, whereby either gaseous or liquid medium may be injected into the interior of the casing-piston-rod fluid system described.

References Cited in the file of this patent

UNITED STATES PATENTS

| | | |
|---|---|---|
| 254,917 | Canet | Mar. 14, 1882 |
| 1,886,712 | Messier | Nov. 8, 1932 |
| 1,918,322 | Cross | July 18, 1933 |
| 1,918,699 | Gruss | July 18, 1933 |
| 2,045,027 | Sanford | June 23, 1936 |
| 2,207,088 | Coleman | July 9, 1940 |
| 2,224,306 | Krueger | Dec. 10, 1940 |
| 2,369,007 | Beecher | June 10, 1943 |
| 2,436,573 | Heynes | Feb. 24, 1948 |

FOREIGN PATENTS

| | | |
|---|---|---|
| 359,201 | France | Jan. 13, 1906 |
| 452,217 | France | Mar. 2, 1912 |
| 636,778 | France | Apr. 16, 1928 |
| 751,475 | France | June 19, 1933 |
| 475,417 | Great Britain | Nov. 18, 1937 |